May 13, 1952    J. CARPANI    2,596,761
FIRE EXTINGUISHER FOR MOTOR VEHICLES
Original Filed June 28, 1937    5 Sheets-Sheet 1
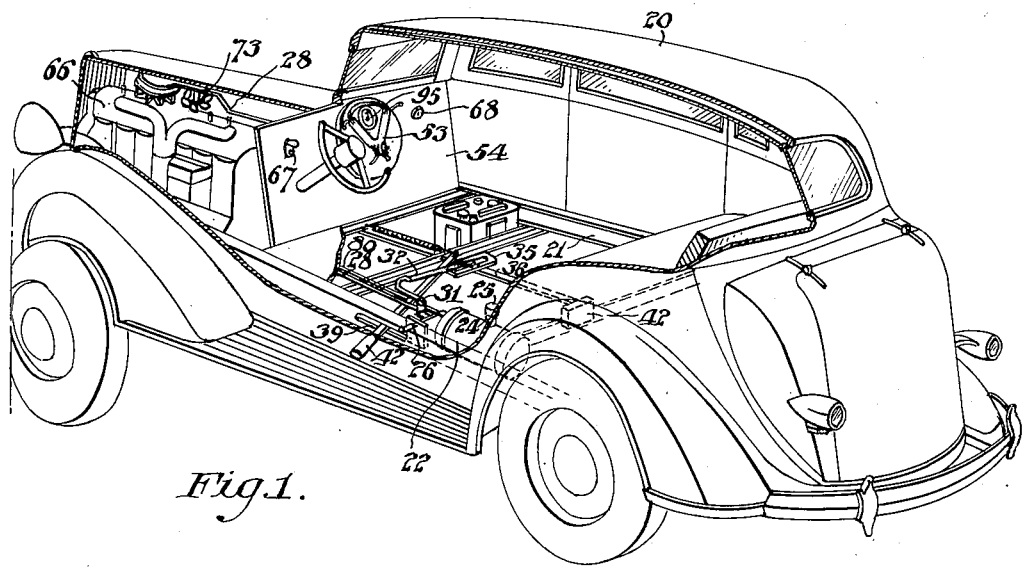
Fig.1.
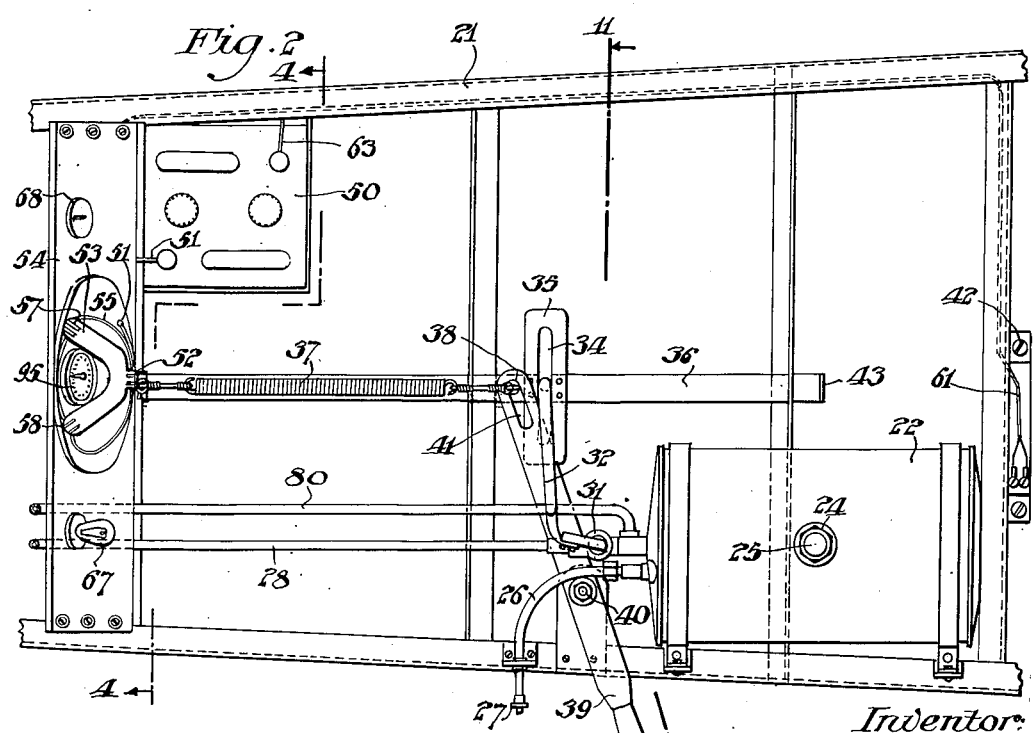
Inventor:
Joseph Carpani,
By W. B. Williamson
Attorney May 13, 1952  J. CARPANI  2,596,761
FIRE EXTINGUISHER FOR MOTOR VEHICLES
Original Filed June 28, 1937  5 Sheets-Sheet 2
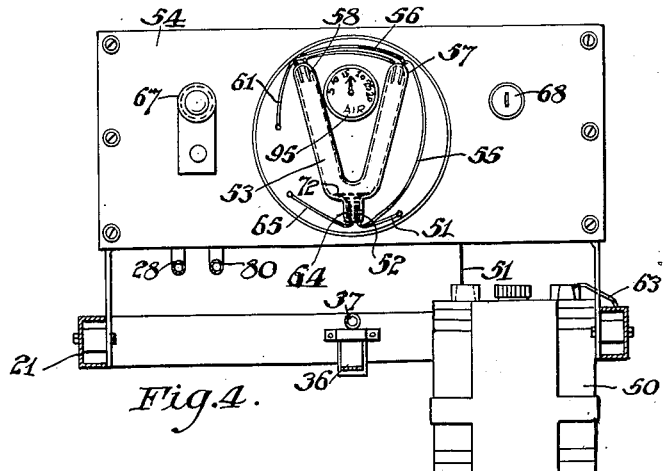
Fig.4.
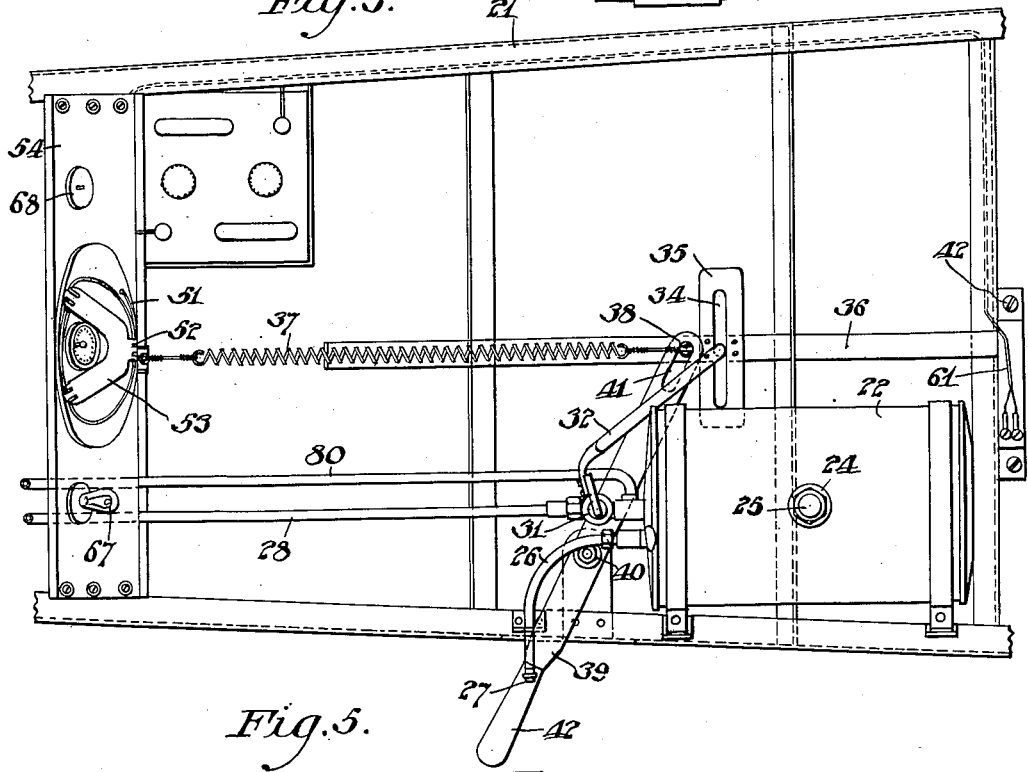
Fig.3.
Fig.5.
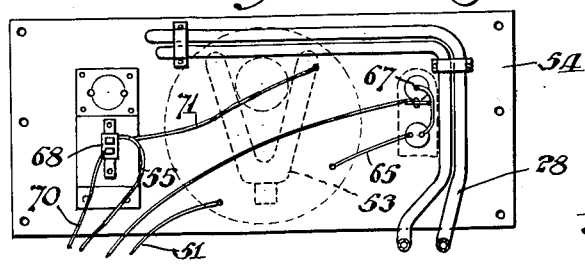
Inventor:
Joseph Carpani,
By W. W. Williamson
Attorney.

May 13, 1952     J. CARPANI     2,596,761
FIRE EXTINGUISHER FOR MOTOR VEHICLES
Original Filed June 28, 1937     5 Sheets-Sheet 3
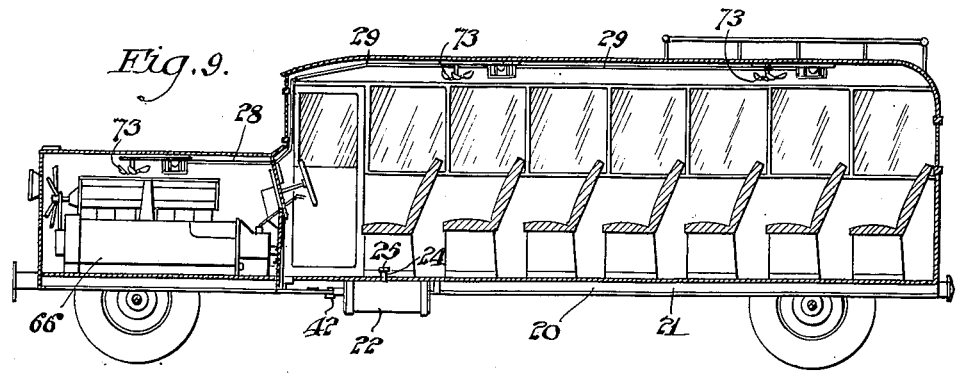
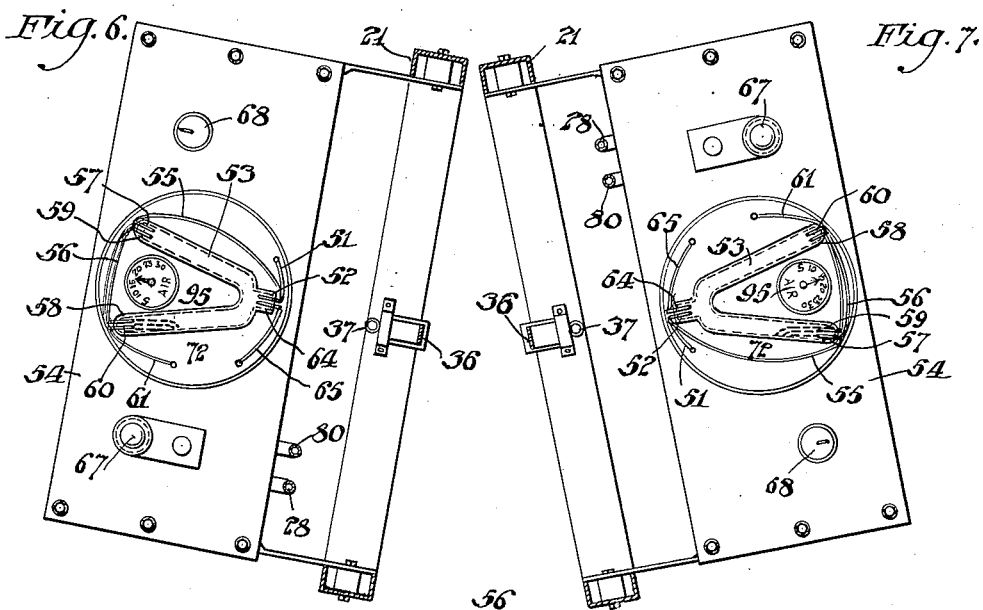
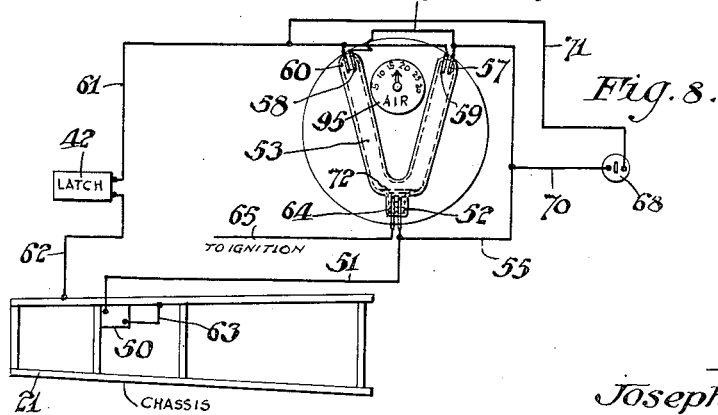
Inventor:
Joseph Carpani,
By W. W. Williamson
Attorney.

May 13, 1952  J. CARPANI  2,596,761
FIRE EXTINGUISHER FOR MOTOR VEHICLES
Original Filed June 28, 1937  5 Sheets-Sheet 4

Inventor:
Joseph Carpani,
By W. W. Williamson
Attorney

May 13, 1952            J. CARPANI            2,596,761
FIRE EXTINGUISHER FOR MOTOR VEHICLES
Original Filed June 28, 1937            5 Sheets-Sheet 5
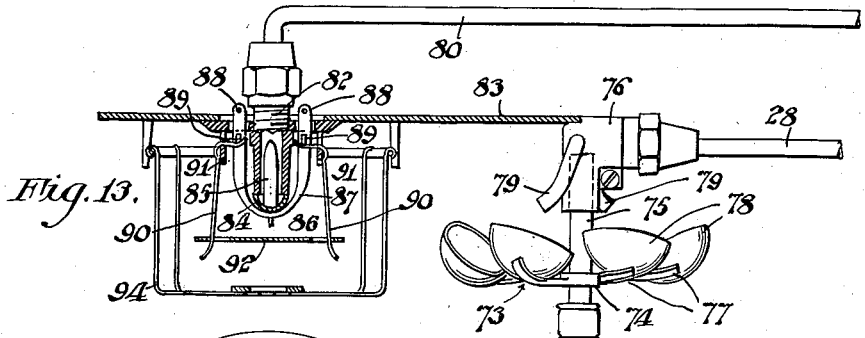
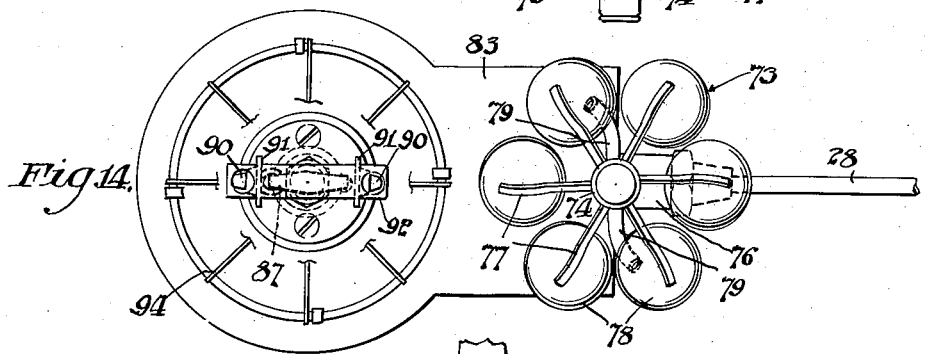
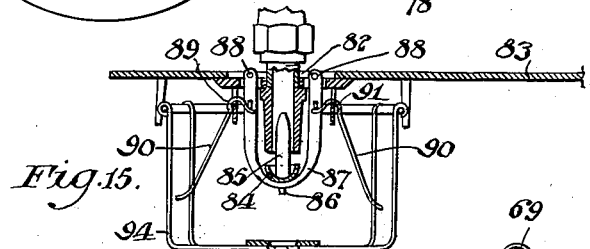
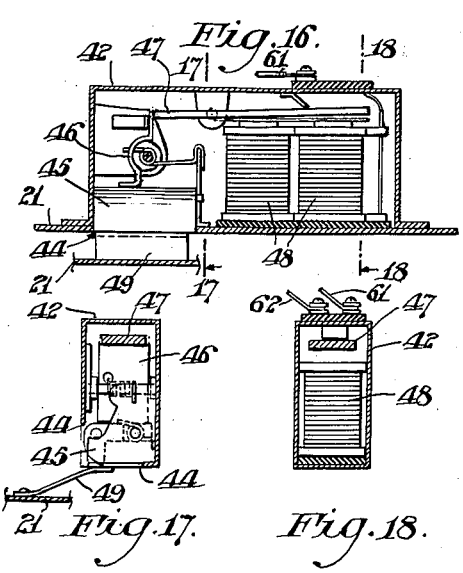
Inventor:
Joseph Carpani,
By W. W. Williamson
Attorney Patented May 13, 1952

2,596,761

UNITED STATES PATENT OFFICE 2,596,761

FIRE EXTINGUISHER FOR MOTOR VEHICLES

Joseph Carpani, Camden, N. J.

Substituted for application Serial No. 150,696, June 28, 1937. This application February 23, 1952, Serial No. 272,979

9 Claims. (Cl. 169—2).

My invention relates to a new and useful fire extinguisher for motor vehicles, originally disclosed in the abandoned application Serial No. 150,696, filed June 28, 1937, for which this application is a substitute and has for one of its objects to provide a combination of elements which will cause a fire extinguishing substance to be sprayed over a large area of one or more localities of the motor vehicle should said vehicle turn over which is generally due to accidents.

Another object of my invention is to mount a container at some suitable place on the vehicle and especially locate it where it can be conveniently filled with a fire extinguishing liquid or substance and supplied with air under pressure, to provide a valve controlled outlet means leading to a place or places where fire may occur, to provide means manually operable in one direction for closing the valve and spring actuated in the opposite direction, for automatically opening the valve, to provide an electrically operated latch or lock for normally holding the valve actuating means in the position where the valve is closed, and to provide a mercury fluid switch in an electric circuit connected with the latch or lock.

Another object of my invention is to produce a mercury switch of unique construction.

Another object of my invention is to include the mercury switch in the electrical ignition circuit of the vehicle.

Another object of my invention is to provide a by-pass around the valve whereby the fire extinguishing substance can be separately controlled by means other than the valve.

Another object of my invention is to provide a manually operable switch in the electric circuit whereby the valve actuating mechanism may be released from within the vehicle should fire occur while the vehicle is in an upright position and occupied by a person.

Another object of the present invention is to include a closure normally maintained in a closed position by a fusible element which, when melted, will release the fire extinguishing substance should a fire occur while the vehicle is unoccupied.

A further object of the invention is to provide a rotary spreader actuated by the projected fire extinguishing substance and of such construction that said fire extinguishing substance will be sprayed or distributed over a large area.

It is a well known fact that motor vehicles, such as automobiles, airplanes and motor boats, often catch fire when turned over in accidents due to the presence of a highly combustible liquid used as fuel. Under such a condition it is generally impossible to make use of a portable fire extinguisher. The disadvantageous condition referred to above is overcome by my invention because it is automatic in operation and functions during a time when a person or persons occupying the vehicle may be unable to escape or use a hand fire extinguisher or attract the attention of other persons. The invention would be particularly beneficial for use in public service vehicles, such as omnibuses, because of the additional safety for the passengers. Considerable importance is attached to the unique construction of the mercury switch as distinguished from switches actuated by pendulums or swinging bodies because the mercury switch is not affected by the ordinary rocking motions of the vehicles.

With the above and other objects in view and the advantages hereinafter enumerated, this invention consists of the details of construction and combination of elements hereinafter set forth and then designated by the claims.

In order that those skilled in the art to which this invention appertains may understand how to make and use the same, I will describe a construction in detail referring by numerals to the accompanying drawings forming a part hereof, in which:

Fig. 1 is a perspective view of motor vehicle, illustrated as an automobile, partly in elevation and partly in section, generally showing an installation of my invention.

Fig. 2 is an enlarged fragmentary plan view of the vehicle chassis illustrating the relation of several of the main elements of the invention and showing the control valve and associated parts in the open or functioning position.

Fig. 3 is a similar view with the control valve closed.

Fig. 4 is a transverse sectional view on the line 4—4 of Fig. 2.

Fig. 5 is a rear face view of the instrument board of equivalent member illustrating a possible relation of some elements to the mercury switch.

Fig. 6 is a transverse sectional view similar to Fig. 4 but without the battery illustrating the condition of the mercury switch when the vehicle turns over sidewise in one direction.

Fig. 7 is the same kind of a view showing the conditions when the vehicle turns over in the opposite direction.

Fig. 8 is a wiring diagram of the electrical circuits.

Fig. 9 is a longitudinal sectional view of an omnibus illustrating another installation of my invention.

Fig. 13 is a view, partly in elevation and partly in section, of the rotary spreader and the outlet nozzle, which is controlled by a fusible element shown in a closed position.

Fig. 14 is a bottom plan view thereof.

Fig. 15 is a sectional view of the outlet nozzle controlled by the fusible element shown in an open condition.

Fig. 16 is an enlarged vertical longitudinal sectional view of the electrically actuated latch or lock and contiguous cooperating elements.

Fig. 17 is a section on the line 17—17 of Fig. 16.

Fig. 18 is a section on the line 18—18 of Fig. 16.

Fig. 19 is a detail of one form of manually operated switch for closing the electrical circuit to the lock or latch.

In carrying out my invention as herein embodied 20 represents a vehicle which, for purposes of illustration only, is shown as a sedan automobile in Fig. 1 and as an omnibus in Fig. 9. Also for purposes of illustration only, the vehicle is represented as including a chassis or frame 21.

Figure 12:
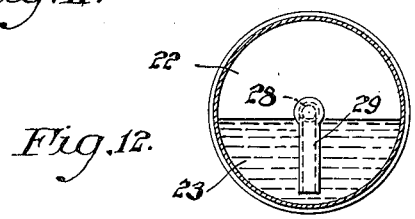
Fig. 12 is a sectional view, on the line 12—12 of Fig. 10, of the tank holding the fire extinguishing substance and compressed air.

A container 22 is mounted in a suitable place on the vehicle and holds a fire extinguishing substance 23, Fig. 12, preferably in liquid form, and air under pressure. The container has a filling inlet 24 conveniently located for placing the fire extinguishing substance therein and said inlet is normally maintained liquid and airtight by a closure 25. Also said container has an air inlet tube 26 leading thereto so air can be pumped or otherwise forced into the container to build up a desired pressure within said container and said air inlet tube has a valve 27 therein the same as or similar to a tire valve so that the usual tire pump or air compressor of service stations can be used for supplying air to the container.

A conduit 28 communicates with the interior of the container 22 and leads to a locality in the region of the vehicle motor, as illustrated in Fig. 1, or to said locality and by branch conduits 29 to a point or points within the vehicle body, as shown in Fig. 9, or to any desirable part or parts of the vehicle. A short piece of pipe 30 is swiveled to the end of the conduit 28 within the container 22 so that regardless of the position of the vehicle and therefore said container, the inlet end of the pipe 20 will be submerged in the fire extinguishing substance so long as there is any appreciable amount of said fire extinguishing substance in the container.

Figure 10:
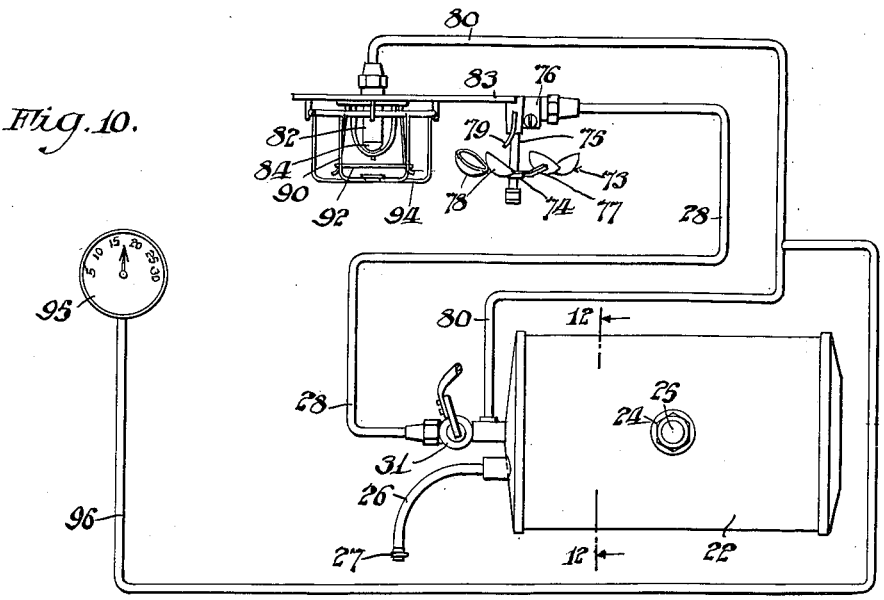
Fig. 10 is a diagrammatic view of the mechanical features of the invention.
Figure 11:
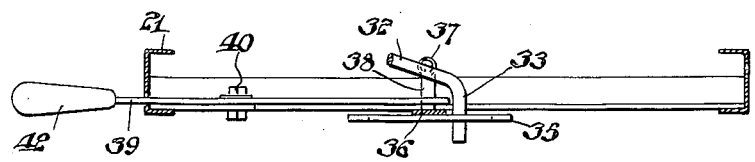
Fig. 11 is a sectional view of the valve operating mechanism on the line 11—11 of Fig. 2.

A valve 21 is located in the conduit 28 to control the flow of compressed air propelled fire extinguishing substance through said conduit 28 from the container 22. This valve 31 has a handle 32 with an angular extension 33, Fig. 11, that projects into the slot 34 of the cross head 35 on the slicing bar 36. Whenever the bar 36 is moved longitudinally, the valve 31 will be operated to either open or close the same.

The bar 36 is mounted in suitable supports, such as cross piece of the frame or chassis, and is urged endwise in one direction by a spring 37 having one end anchored to some part of the vehicle, as the stationary element, and the other end connected to a post 38 on the sliding bar 36, as the movable element. Said sliding bar 36 may be moved endwise in the opposite direction by a handle lever 39 pivoted at 40 to a suitable support, as a part of the vehicle, and the inner end of said lever has a slot 41 registering with the post 38 or equivalent means. The outer end of said handle lever 39 is located in a convenient position to be operated when necessary and for purposes of illustration only it is shown as projecting through a side of the vehicle. Said outer end of the handle lever 39 may have a grip 42 if desirable. By moving the outer end of the handle lever 39 to the left, considering Figs. 2 and 3, the bar 36 will be moved in opposition to the action of the spring 37 and towards the electrically operated lock 42 to be presently described.

For convenience of description the lock will be considered as mounted to the rear of the sliding bar 36. The rear end of said bar has a right angle lip 43 thereon, Fig. 2, which, when the bar is moved by the handle lever 39 longitudinally outward or toward the lock, enters an opening 44 in the lock casing and as shown in Fig. 17 this opening extends through one face and the bottom of said lock casing. Within the casing, in alignment with the opening, is a catch 45 spring actuated in the direction which closes the catch as shown in Fig. 17 and said catch is positively held in the closed position by a spring actuated dog 46 through the medium of an armature lever 47. The spring connected with the dog normally returns it to the holding position so the adjacent end of the armature lever 47 may drop in front of the upper end of said dog. The armature lever is disengaged from the dog by the electromagnets 48 when said magnets are energized. Due to the normally closed position of the catch 45 the end of the bar 36 carrying the lip 43 must ride under the nose of the catch wherefore said nose has a rounded outer surface and a spring 46 is mounted on the vehicle in the path of travel of the rear end of the bar 36 so that the lip 43 after riding under the nose of the catch will be forced upward into engagement with the back of said nose.

With the lip 43 held by the catch 45 the bar 36 is held in its outward position shown in Fig. 3 and the spring 37 is expanded while the valve 31 is closed. If the magnets 48 are energized the armature lever 47 will be actuated to disengage it from the dog 46. The tension of the spring 37 acting upon the catch 45 of the lock through the bar 36 and its lip 43 will swing the catch 45 to an open position and release the bar 36. Of course the opening movement of the catch pushes the dog 46 out of the way. As soon as the bar 36 is released the spring 37 moves said bar 36 longitudinally inwardly and imparts an opening movement to the valve 31 so the compressed air in the container 22 is released and acts as a carrier to convey the fire extinguishing substance from said container to the point or points of delivery for use in extinguishing fires.

The electrical circuits controlling the electrically actuated latch or lock 42 will be more readily understood by reference to Fig. 8 wherein 50 represents a battery, as the source of electric current, from one side of which leads a conductor 51 to one terminal 52 in the bottom of the V-shaped tube 53 mounted in a convenient place in the vehicle, as on the dash or instrument board 54. A branch conductor 55 leads from the conductor 55 to a bridging conductor 56 connecting the terminals 57 and 58 in the upper ends of the separate legs of the V-shaped tube, which legs are in communication at the bottom ends. Companion terminals 59 and 60 are also mounted in the upper ends of the separate legs of said V-shaped tube and are both connected by a common conductor 61 with one pole of the latch or lock 42. The other pole of the latch or lock is connected with the other side of the battery 50 through a conductor 63. There is another terminal 64 in the bottom of the V-shaped tube 53 and from this leads a conductor 65 to the electrical ignition of the motor 66 of the vehicle. If desirable an electric light 67 may be included in the ignition circuit. A manually operable switch 68, preferably of the type having a removable key 69, Fig. 19, to actuate the same, is shunted around the V-shaped tube 53 by connecting one side of said switch 68 through a conductor 70 with the conductor 55 or 51 and by connecting the other side of said switch 68 through a conductor 71 with the conductor 61.

The V-shaped tube 53 contains mercury 72 that can enter either leg of said tube according to the position of the latter and this mercury is normally at the bottom of the tube so as to bridge the terminals 52 and 64 and thus complete an electrical circuit from the battery 50 through conductor 51, terminal 52, mercury 72, terminal 64, conductor 65 to the ignition and back to the battery 50 through the ground elements of the vehicle in any usual manner.

Should the vehicle be turned over, for example towards the left the mercury will flow into the left leg of the V-shaped tube 53, as shown in Fig. 6. This will open the circuit to the ignition so that the motor will stop and as the mercury bridges the terminals 58 and 60 a circuit will be completed from the battery 50 through conductors 51, 55 and 56 to terminal 58, thence through the mercury 72, terminal 60, conductor 61, electro-magnets 48 of the latch or lock to the ground elements and back to the battery 50. Upon the latter circuit the latch or lock will release the sliding bar and the fire extinguishing substance will be delivered as previously explained.

Should the vehicle turn over in a generally right handed direction the mercury will flow into the right leg of the V-shaped tube 53, as shown in Fig. 7. This will open the ignition circuit, as will be obvious and as the mercury bridges the terminals 57 and 59 another circuit will be closed from the battery through conductors 51 and 55 to the terminals 57, thence through the mercury, the terminal 59, the conductor 61, the magnets of the latch or lock the conductor 62 and the ground elements back to the battery.

It might be well to state at this time that the operation of the device does not depend upon the vehicle turning over actually either to the right or left, but generally speaking a vehicle when turning over has a tendency to swing to one side or the other and therefore the terms used have been employed only for purposes of clearness of description. Assuming that the vehicle turned over frontwards or backwards on an even keel the mercury might be "split" so that some of it would flow into both legs of the V-shaped tube and since there is a sufficient amount of mercury in the tube to take care of such a condition both circuits would be opened and therefore the apparatus will function as set forth.

It is to be fully understood that the ignition circuit only has to be opened and either of the other circuits closed momentarily to cause the motor to cease operating and the fire extinguisher to function.

In order to distribute the fire extinguishing substance over a large area I prefer to provide a spinning sprayer 73 including a hub 74 journalled on a suitable trunnion 75 depending from a fitting 76 connected to the conduit 28 or the branches 29 thereof. The hub 74 is provided with radial arms 77 carrying tilted semi-spherical cups 78 which receive the impulse of the compressed air carrying the fire extinguishing substance to impart a rotary motion to the spinning sprayer. Because of the formation of the cups the fire extinguishing substance is deflected and also thrown about by centrifugal force to cover a wide expanse of surface adjacent the sprayer. The fire extinguishing substance is fed to the spinning sprayer through one or more nozzles 79, preferably two, connected with the conduit 28, as through the fitting 76.

The distribution of the fire extinguishing substance is also controlled by a valve normally retained in a closed position by a fusible element. To carry out this feature of the invention, a conduit 80 is connected with the container, as through the conduit 28 ahead of the valve 31. Said conduit 80 may lead to a locality in the region of the motor, as in Fig. 1 or to said locality and to other places such as different parts of the vehicle body by branches 81 of said conduit 80, as in Fig. 9.

The conduit 80, and the branches 81 whenever used, each terminate in a nozzle 82 projecting through a supporting plate 83 which is attached to the fitting 76 or any convenient part of the vehicle. The bottom or outlet end of the nozzle 82 is normally closed by a semi-spherical cup 84 having a guide pin 85 projecting into the nozzle 82 and also having positioning pin 86 which sets in a hole in the stirrup 87. The upper ends of the stirrup arms slide through apertures in the supporting plate 83 and are prevented from completely dropping away from said supporting plate by holding pins 88 fixed in the upper ends of the stirrup arms. The arms of the stirrup have lugs 89 thereon, preferably on both sides, and a suitable distance below the upper ends of said arms.

These lugs 89 are engaged by the short legs of the bell crank levers 90 pivoted or hung by their angles or crotches in the hangers 91 depending from the supporting plate 83. The bell crank levers are normally held in closed position, as illustrated in Figs. 13 and 14 by a fusible element or strip 92 having holes in the ends thereof for registration with the lower ends of the long legs of said bell crank levers. When the bell crank levers are held by the fusible strip, the valve 84 is pressed tight against the outlet end of the nozzle 82 and prevents the escape of the fire extinguishing substance. Should the temperature in the region of the nozzle 82 rise to a sufficiently high degree to melt the fusible element 92, as in case of fire, the bell crank levers will be released and due especially to the pressure of the compressed air the valve 84 will be forced open permitting the compressed air carrying the fire extinguishing substance to flow from the nozzle and be sprayed on adjacent objects. Because of the semi-spherical shape of the valve 84 the course of the compressed air and conveyed fire extinguishing substance will be deflected for efficiently distributing the same.

The nozzle 82, valve 84 and component parts are enclosed by a protective or shielding cage 94 to prevent the parts being accidentally struck and damaged.

As it is desirable that the operator of the vehicle be able to ascertain the pressure within the container 22 to know whether the apparatus is in working condition, I provide a pressure gage 95 connected by a conduit 96 with the container, as through the conduit 80 or otherwise and I prefer to locate said gage 95 on the instrument or dash board and I have found that a convenient place is between the arms of the V-shaped tube 53 although I desire it to be understood that I am not restricted to these suggested locations.

From the foregoing it will be obvious that I have provided a highly efficient apparatus which will function automatically should the vehicle turn over or should fire occur unnoticed and one which can be placed in operation by manually actuating a switch.

By mounting the V-shaped tube 53 at a suitable inclination with the upper ends of its arms above and forward of the junction of said arms, the mercury may be propelled through the tube arms should the travel of the vehicle be suddenly arrested due to a head on collision. This will cause an operation of the fire extinguisher apparatus, whereas the ordinary quick stopping of the vehicle when using the brakes will not do so.

Having described my invention, what I claim as new and useful is:

1. A fire extinguisher for motor vehicles comprising, in combination, a container to hold a fire extinguishing substance and compressed air as a carrier for said substance, said container having an outlet, a valve to control said outlet, mechanism to operate said valve and spring urged in a direction to open said valve, electrically operated means to temporarily hold said mechanism in a position to maintain the valve closed, a mercury switch and electrical circuits, one of which is normally closed through the ignition circuit of the vehicle and at least one other of which includes the electrically operated holding means, said last named circuit being normally open and when closed causing the holding means to release the mechanism for opening the valve to permit the escape of the fire extinguishing substance due to the pressure of the compressed air.

2. The structure of claim 1, in combination with a manually operable electrical switch shunted across the circuit including the electrically operated holding means.

3. In a device of the character described, a container mounted on a vehicle and containing a fire extinguishing substance under pressure, a conduit connected to said container and leading to at least one place on the vehicle where said substance is to be delivered in case of fire, a valve in said conduit and having an operating lever, sliding means to which the lever is connected for actuating said lever, means to normally urge said sliding means in a direction to open the valve and manually movable in the opposite direction to close the valve, means to temporarily hold the sliding means in the position where the valve is closed and electrically operable to release said sliding means whereby the latter may be moved in the direction to open the valve, a V-shaped tube, electric circuits having terminals at the upper ends and the junction of the arms of said tube, the circuit whose terminals are at the junction including the ignition of the vehicle and the circuits whose terminals are at the upper ends of the tube arms including the means to hold the sliding means and mercury in the tube adapted to flow into either arm thereof according to the direction of an excessive tilting of the vehicle to open the circuit to the ignition and close one of the other circuits.

4. A fire extinguisher for motor vehicles comprising, in combination, a container mounted on the vehicle and adapted to hold compressed air and a fire extinguishing substance and provided with a filling opening, a removable closure for said opening, an air inlet tube connected to the container, a valve in said tube to prevent escape of air through said tube, an outlet conduit connected to said container and leading to at least one locality on the vehicle where fire may occur, a control valve in said outlet conduit, valve operating mechanism connected to the movable element of said control valve, means to urge said mechanism in a direction to open the control valve and manually movable in a direction to close said control valve, a lock to temporarily hold said mechanism in the position where the control valve is closed and electrically operable to release said mechanism whereby the mechanism may be moved in the direction to open the control valve, a V-shaped mercury switch having its legs diverging upwardly, and normally open electric circuits each including one leg of said mercury switch and said lock whereby when the vehicle is overturned the circuit will be closed at the mercury switch to actuate the lock and release the mechanism to open the control valve for supplying the fire extinguishing substance under pressure.

5. The structure in claim 4, in combination with a manually operable switch in access of the operator of the vehicle to also close said electric circuit.

6. A fire extinguisher for motor vehicles comprising, in combination, a container mounted on the vehicle and adapted to hold compressed air and a fire extinguishing substance and provided with a filling opening, a removable closure for said opening, an air inlet tube connected to said container, a valve in said tube to prevent the escape of air through the tube, an outlet conduit connected to the container and leading to a position in the region of the vehicle motor, a control valve in said conduit, a bar slidably mounted on the vehicle, a slotted cross-head carried by said bar, an operating lever on the control valve and having a part projected through the slot in the cross-head whereby movements of the bar will be transmitted to the control valve to open and close said control valve, a spring to urge the bar in a direction to open the control valve, a handle lever pivoted on the vehicle connected to the bar so that it may be manually moved in a direction to close valve, a lip on the outer end of the bar, a lock mounted on the vehicle in the path of travel of said lip to engage the latter for temporarily holding the bar in the position where the control valve is closed and electrically operable to release the lip to permit the spring to move the bar in a direction to open said control valve, a flat spring to be engaged by the bar to permit the lip to ride under the lock and then be urged into said block, a V-shaped tube mounted on the vehicle, an electric circuit including a source of current and the ignition system of the vehicle, said circuit having separated terminals in the tube at the junction of its legs, other electric circuits including said source of current, and the lock, one of said last named circuits having separated terminals in the upper end of one of the tube legs and the other of said last named circuits having separated terminals in the upper end of the other tube leg, and a quantity of mercury in the tube to normally maintain the first mentioned circuit closed and flowable into either of the tube legs due to overturning of the vehicle whereby said first mentioned circuit will be opened and one of the other circuits will be closed for actuating the lock.

7. The combination with a motor vehicle, of a container to hold a fire extinguishing substance under pressure, a conduit leading from said container to several localities of the vehicle, a valve in said conduit, means to operate said valve, a catch to normally hold said valve operating means in a position where the valve is closed, electrically operable means to normally prevent movement of the catch, a V-shaped mercury tube mounted in a tilted position on the dash board of the vehicle, normally open electric circuits including a source of electricity, terminals of the open electric circuits in the upper ends of the mercury tube arms and the electrically operable means whereby whenever the vehicle is turned over one of said circuits will be closed to actuate the electrically operable means to release the valve operating means for opening the valve, and manually operable means to close an electric circuit to said electrically operable holding means.

8. A fire extinguisher for motor vehicles comprising, in combination with a motor vehicle including an electrical ignition system, of means to store a fire extinguishing substance under pressure on the vehicle, a valve controlled outlet from said storage means; mechanism spring actuated in one direction to open the outlet, means to hold said mechanism in a position to retain the outlet closed and electrically operable to release the mechanism, electrical circuits including said mechanism holding means and the ignition system, a V-shaped mercury switch having its legs diverging upwardly and interposed in said electrical circuits with terminals at the junction of the legs to normally maintain a closed circuit through the ignition system, and terminals in the upper portion of the legs and adapted to open the circuit through the ignition circuit and close the circuit through the mechanism holding means when the vehicle is tilted to an excessive degree.

9. A fire extinguisher for motor vehicles comprising, in combination, a container to hold a fire extinguishing substance and compressed air as a carrier for said substance, said container having an outlet, a valve to control said outlet, mechanism to operate said valve and spring urged in a direction to open said valve, a spring catch to temporarily hold said mechanism in a position to maintain the valve closed, electrically operated means to release said holding means, a V-shaped mercury switch having its legs diverging upwardly, and electrical circuits including the mercury switch, one of which is normally closed through an ignition circuit of the vehicle, and at least one other of which includes the electrically operated holding means, said last named circuit being normally open and when closed causing the holding means to release the mechanism for opening the valve to permit the escape of the fire extinguishing substance due to the pressure of the compressed air.

JOSEPH CARPANI.

REFERENCES CITED

The following references are of record in the file of this patent:

UNITED STATES PATENTS

| Number | Name | Date |
| --- | --- | --- |
| 173,434 | Bach | Feb. 15, 1876 |
| 400,688 | Kersteter | Apr. 2, 1889 |
| 453,055 | Ware | May 26, 1891 |
| 829,621 | Banning | Aug. 28, 1906 |
| 855,205 | Scott | May 28, 1907 |
| 974,176 | Newman | Nov. 1, 1910 |
| 1,056,009 | Crouch | Mar. 18, 1913 |
| 1,137,016 | Nutter | Apr. 27, 1915 |
| 1,289,360 | Bargar | Dec. 31, 1918 |
| 1,338,778 | Jones | May 4, 1920 |
| 1,762,220 | Faber | June 10, 1930 |
| 1,791,294 | Ware | Feb. 3, 1931 |
| 1,840,986 | Townsend | Jan. 12, 1932 |
| 1,852,539 | Ross | Apr. 5, 1932 |
| 2,015,995 | Egtvedt | Oct. 1, 1935 |

FOREIGN PATENTS

| Number | Country | Date |
| --- | --- | --- |
| 352,599 | Great Britain | July 16, 1931 |